United States Patent
Brathwaite et al.

(10) Patent No.: US 11,422,391 B1
(45) Date of Patent: Aug. 23, 2022

(54) COLORED STROBE FOR MOBILE PHONE

(71) Applicants: Bevan Brathwaite, Paisley, FL (US); Jean Desir, Paisley, FL (US)

(72) Inventors: Bevan Brathwaite, Paisley, FL (US); Jean Desir, Paisley, FL (US)

( * ) Notice: Subject to any disclaimer, the term of this patent is extended or adjusted under 35 U.S.C. 154(b) by 276 days.

(21) Appl. No.: 16/835,452

(22) Filed: Mar. 31, 2020

(51) Int. Cl.
*G02C 7/10* (2006.01)
*G02B 5/04* (2006.01)
*H04M 1/02* (2006.01)
*F16M 11/04* (2006.01)

(52) U.S. Cl.
CPC .......... *G02C 7/108* (2013.01); *F16M 11/041* (2013.01); *G02B 5/04* (2013.01); *H04M 1/026* (2013.01)

(58) Field of Classification Search
CPC ........ G02C 7/108; F16M 11/041; G02B 5/04; H04M 1/026
See application file for complete search history.

(56) References Cited

U.S. PATENT DOCUMENTS

| | | | | |
|---|---|---|---|---|
| 7,589,785 B2 * | 9/2009 | Kobayashi | ............ | G03B 15/05 348/371 |
| 9,110,355 B1 * | 8/2015 | Nourbakhsh | .......... | G03B 15/05 |
| 9,395,606 B1 | 7/2016 | Harris | | |
| 9,497,369 B1 | 11/2016 | Lin | | |
| 9,726,960 B2 * | 8/2017 | Xu | ....................... | H04N 5/2256 |
| 10,223,564 B2 * | 3/2019 | Powell | ............... | G06K 7/10722 |
| 10,267,493 B2 * | 4/2019 | Wang | ................. | H04M 1/0272 |
| D849,732 S | 5/2019 | Mischel | | |
| 10,571,793 B2 * | 2/2020 | Rebot | ..................... | G03B 29/00 |
| 10,708,397 B2 * | 7/2020 | Gifford | ............... | H04M 1/0264 |
| 2007/0098391 A1 * | 5/2007 | Howard | ................. | G03B 17/02 396/155 |
| 2012/0176059 A1 | 7/2012 | Ogino | | |
| 2012/0236425 A1 * | 9/2012 | O'Neill | ............... | G03B 17/565 359/827 |
| 2012/0245422 A1 * | 9/2012 | Hasbun | ................. | G06F 1/1656 600/200 |
| 2013/0267283 A1 * | 10/2013 | Guzman | ............... | H04M 1/026 455/575.1 |
| 2013/0331148 A1 * | 12/2013 | Brough | ................ | H04N 5/2252 455/557 |
| 2014/0078594 A1 * | 3/2014 | Springer | .................. | G02B 7/16 359/821 |
| 2014/0268376 A1 * | 9/2014 | O'Neill | .................. | G03B 17/14 359/827 |
| 2015/0094124 A1 * | 4/2015 | Kuo | ..................... | H04N 5/2256 455/575.1 |
| 2015/0323160 A1 * | 11/2015 | Duguid | ................. | F21V 14/045 362/326 |
| 2015/0362828 A1 * | 12/2015 | Patel | .................... | A61B 1/0661 348/75 |

(Continued)

*Primary Examiner* — Jinsong Hu
*Assistant Examiner* — Rui M Hu

(57) ABSTRACT

The colored strobe for mobile phone comprises an optical instrument and a mounting bracket. The mounting bracket may couple to a mobile phone such that the optical instrument is positioned in front of a flashlight of the mobile phone. The optical instrument may alter optical properties of light emitted by the flashlight as the light passes through the optical instrument. The optical properties may comprise a path of the light, color of the light, or both. Operation of the flashlight while covered by the optical instrument may provide a novelty appearance for the mobile phone.

16 Claims, 4 Drawing Sheets

(56) References Cited

U.S. PATENT DOCUMENTS

| | | | |
|---|---|---|---|
| 2015/0370150 A1* | 12/2015 | O'Neill | H04N 5/2254 |
| | | | 359/809 |
| 2016/0080548 A1* | 3/2016 | Erickson | H04M 1/72409 |
| | | | 382/128 |
| 2016/0249805 A1* | 9/2016 | Salvati | A61B 1/227 |
| | | | 351/206 |
| 2017/0064168 A1* | 3/2017 | Roman | G02B 19/0076 |
| 2017/0119250 A1* | 5/2017 | Kolachalama | A61B 5/0022 |
| 2017/0261182 A1* | 9/2017 | Wang | G02B 19/0047 |
| 2017/0363947 A1* | 12/2017 | Rebot | G03B 29/00 |
| 2018/0092534 A1* | 4/2018 | Nabhan | A61B 3/10 |
| 2018/0164672 A1* | 6/2018 | Rebot | G06K 7/14 |
| 2019/0266384 A1* | 8/2019 | Lee | G06V 20/698 |
| 2019/0331320 A1* | 10/2019 | Gardner | F21V 9/08 |

\* cited by examiner

COLORED STROBE FOR MOBILE PHONE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of novelty accessories for mobile phones, more specifically, a colored strobe for mobile phones.

SUMMARY OF INVENTION

The colored strobe for mobile phone comprises an optical instrument and a mounting bracket. The mounting bracket may couple to a mobile phone such that the optical instrument is positioned in front of a flashlight of the mobile phone. The optical instrument may alter optical properties of light emitted by the flashlight as the light passes through the optical instrument. The optical properties may comprise a path of the light, color of the light, or both. Operation of the flashlight while covered by the optical instrument may provide a novelty appearance for the mobile phone.

An object of the invention is to provide a novelty appearance of the flashlight of a mobile phone.

Another object of the invention is pass light from the flashlight through a lens and a prism to disperse the light, tint the light, mask the path of the light, or combinations thereof.

A further object of the invention is to pass the light through a prism to further disperse the light and, optionally, to mask the path of the light.

Yet another object of the invention is to couple to a mobile phone using a mounting bracket.

These together with additional objects, features and advantages of the colored strobe for mobile phone will be readily apparent to those of ordinary skill in the art upon reading the following detailed description of the presently preferred, but nonetheless illustrative, embodiments when taken in conjunction with the accompanying drawings.

In this respect, before explaining the current embodiments of the colored strobe for mobile phone in detail, it is to be understood that the colored strobe for mobile phone is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the colored strobe for mobile phone.

It is therefore important that the claims be regarded as including such equivalent construction insofar as they do not depart from the spirit and scope of the colored strobe for mobile phone. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
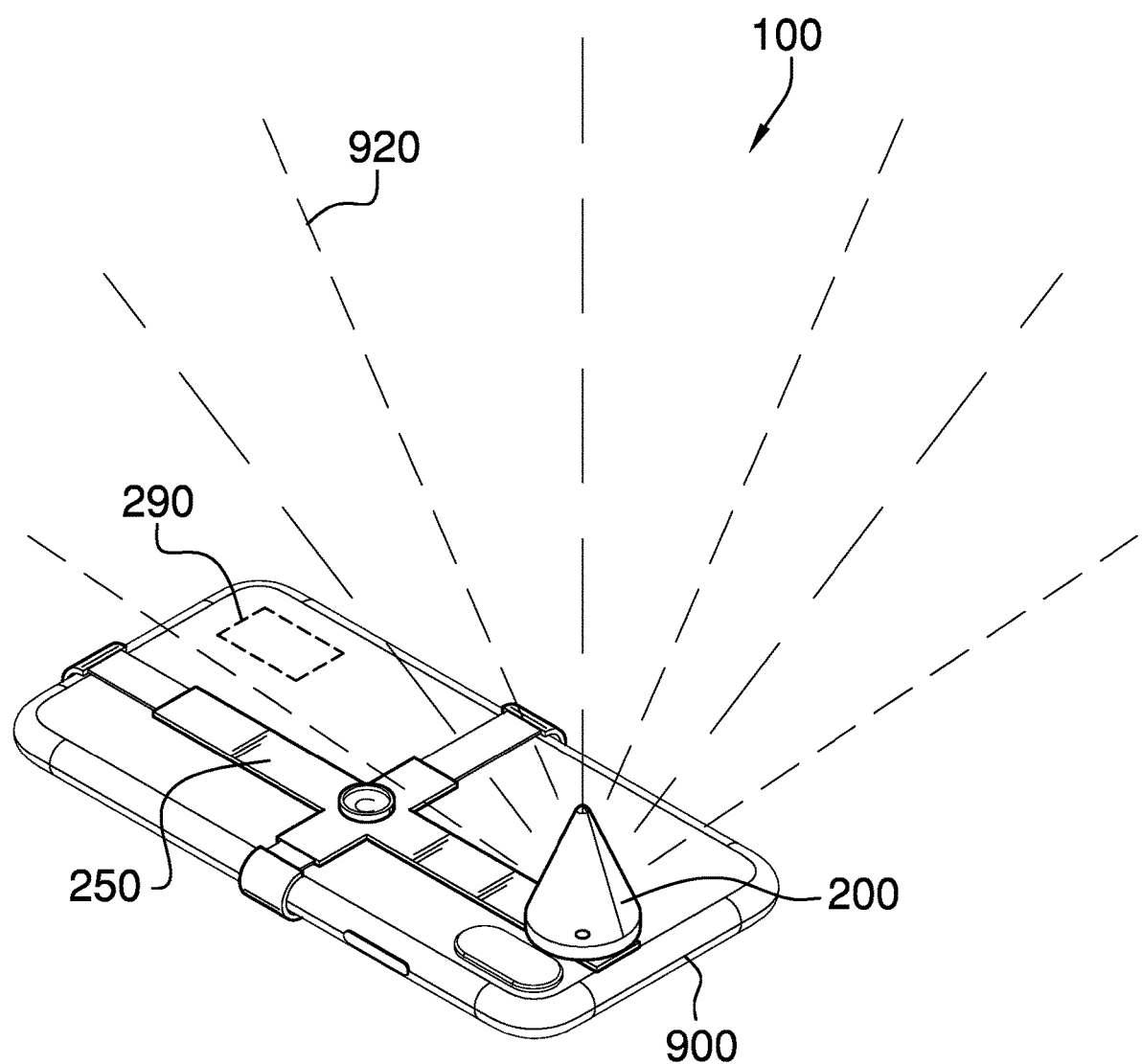
FIG. 1 is an isometric, in-use view of an embodiment of the disclosure.
Figure 2:
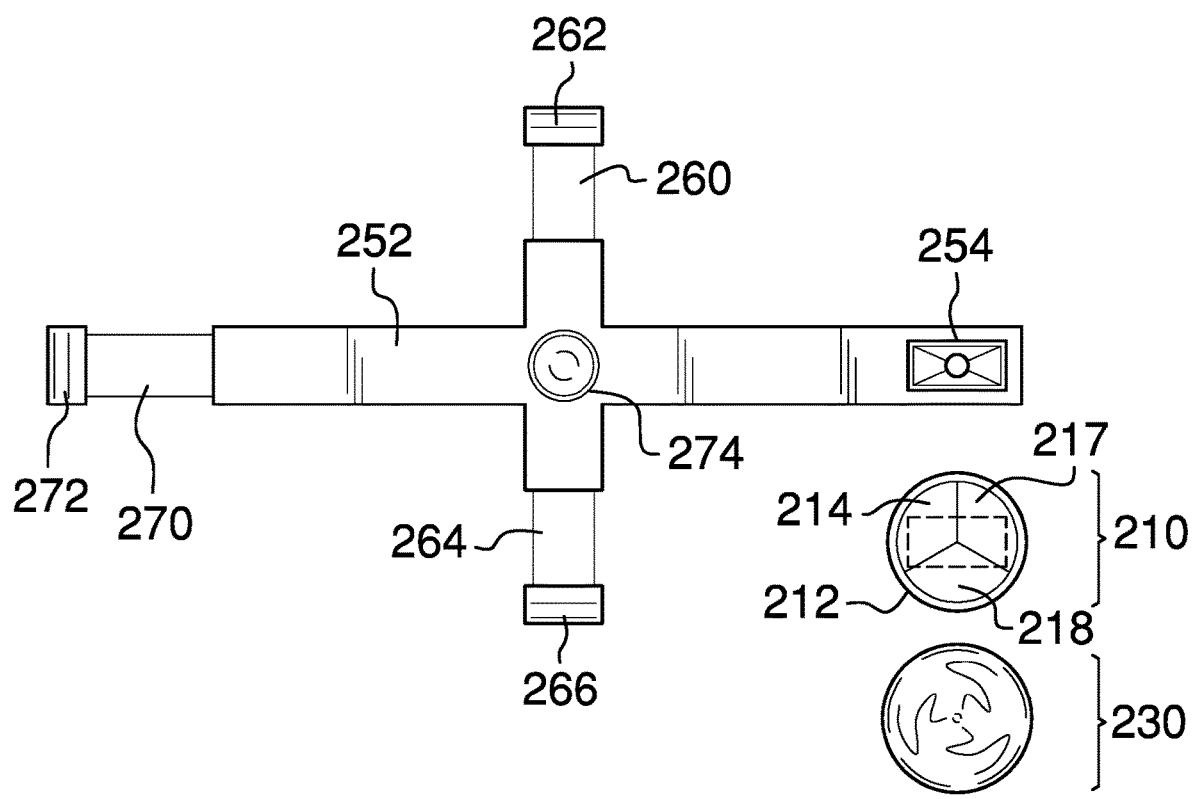
FIG. 2 is a top view of an embodiment of the disclosure illustrating a kit to install on a mobile phone.
Figure 3:
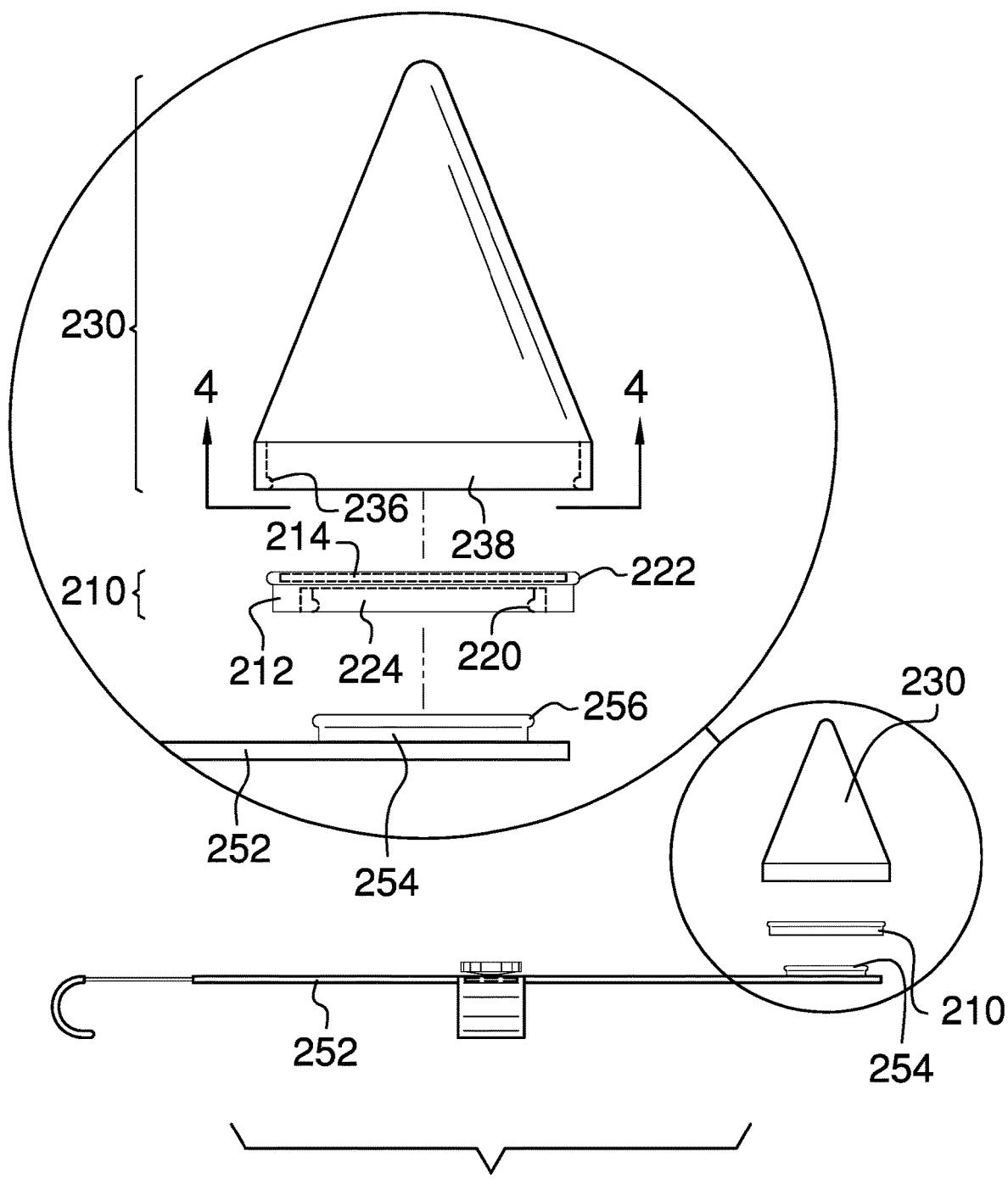
FIG. 3 is a side exploded view of an embodiment of the disclosure.
Figure 4:
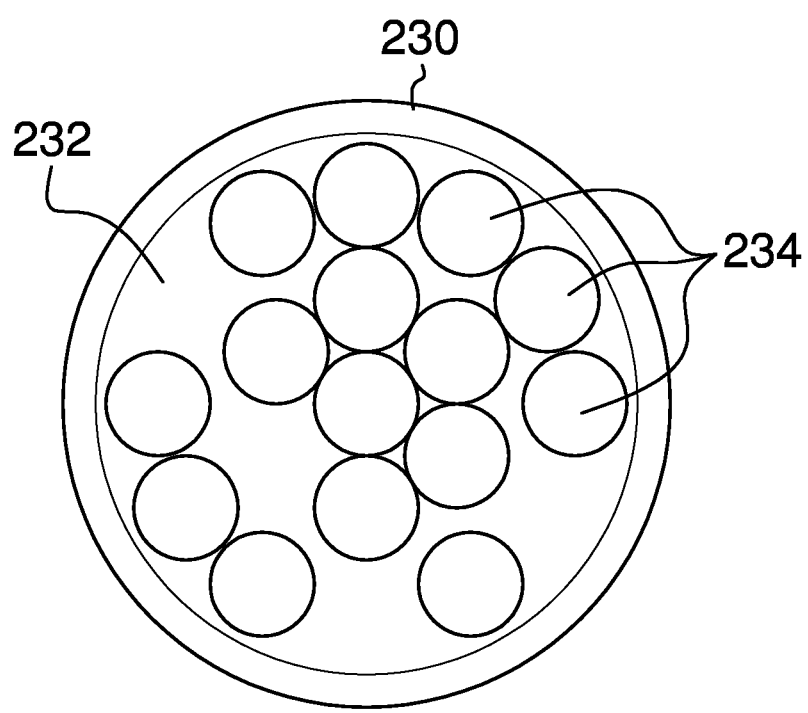
FIG. 4 is a detail bottom view of an embodiment of the disclosure across 4-4 as shown in FIG. 3.

Detailed reference will now be made to a first potential embodiment of the disclosure, which is illustrated in FIGS. 1 through 4.

The colored strobe for mobile phone 100 (hereinafter invention) comprises an optical instrument 200 and a mounting bracket 250. The mounting bracket 250 may couple to a mobile phone 900 such that the optical instrument 200 is positioned in front of a flashlight of the mobile phone 900. The optical instrument 200 may alter optical properties of light 920 emitted by the flashlight as the light 920 passes through the optical instrument 200. The optical properties may comprise a path of the light 920, color of the light 920, or both. Operation of the flashlight while covered by the optical instrument 200 may provide a novelty appearance for the mobile phone 900.

The optical instrument 200 may comprise a lens housing 210 and a prism 230. The optical instrument 200 may detachably couple to the mounting bracket 250 such that the optical instrument 200 is positioned in front of the flashlight of the mobile phone 900. The lens housing 210 may comprise a collar 212 and a lens 214. The lens housing 210 may detachably couple to an optical mount 254 of the mounting bracket 250. The prism 230 may detachably couple to the lens housing 210.

The collar 212 may be a mounting armature. The top of the collar 212 may couple to the lens 214. The bottom of the collar 212 may comprise a collar cavity 224 which may be an upward indentation of the bottom of the collar 212. A collar ridge 220 may surround the collar cavity 224 on the inside wall of the collar cavity 224. The collar ridge 220 may interlock with a mount lip 256 of the optical mount 254 when the collar 212 is coupled to the optical mount 254. The collar 212 may be separated from the optical mount 254 by applying upward force to the collar 212 to overcome the interlocking of the collar ridge 220 and the mount lip 256.

The lens 214 may disperse the light 920 from the flashlight such that the light 920 is redirected towards the entirety of the prism 230. The lens 214 may be transparent material that is shaped to alter the path of the light 920 that passes through the lens 214. In some embodiments, the lens 214 may be a compound, diffractive lens such that the overall thickness of the lens 214 is minimized. As a non-limiting example, the lens 214 may be a Fresnel lens.

The lens 214 may comprise a tint 217 such that white light from the flashlight may be tinted and may emerge from the lens 214 as a different color. As non-limiting example, the tint 217 may result from a coloring agent added to or applied to the lens 214 or from a colored filter that is interposed in the path of the light 920. In some embodiments, the lens 214 may comprise multiple color regions 218 such that the light 920 passing through the lens 214 may vary in color depending upon the specific path the light 920 takes through the lens 214.

The prism 230 may disperse the light 920 that enters the bottom of the prism 230. The top of the prism 230 may comprise transparent material. The bottom of the prism 230 may comprise a prism cavity 238 which may be an upward indentation of the bottom of the prism 230. A prism ridge 236 may surround the prism cavity 238 on the inside wall of the prism cavity 238. The prism ridge 236 may interlock with a collar lip 222 of the collar 212 when the prism 230 is coupled to the collar 212. The prism 230 may be separated from the collar 212 by applying upward force to the prism 230 to overcome the interlocking of the prism ridge 236 and the collar lip 222. In some embodiments, the prism 230 may be a conical shape.

In some embodiments, the prism 230 may comprise a mask 232. The mask 232 may be a partially opaque surface that is located on the bottom of the prism 230. The mask 232 may limit the light 920 passing through the prism 230 such that a pattern of the light 920 is created within the prism 230. The mask 232 may comprise a plurality of apertures 234 such that the light 920 may pass through the mask 232 at the plurality of apertures 234 and the light 920 is blocked by the mask 232 elsewhere. In some embodiments, the plurality of apertures 234 may comprise an irregular spacing such that the pattern of the light 920 dispersed by the prism 230 is not symmetrical.

The mounting bracket 250 may comprise a body 252, a first lateral strap 260, a second lateral strap 264, a longitudinal strap 270, and a locking knob 274. The mounting bracket 250 may detachably couple to the mobile phone 900 and may retain the prism 230 in a position that is in front of the flashlight. The body 252 may be a rigid or semi-rigid armature that slidably couples to the first lateral strap 260, the second lateral strap 264, and the longitudinal strap 270. The body 252 may direct the first lateral strap 260 and the second lateral strap 264 laterally and may direct the longitudinal strap 270 longitudinally such that the first lateral strap 260 and the second lateral strap 264 are perpendicular to the longitudinal strap 270.

The body 252 may comprise the optical mount 254. The optical mount 254 may be a mounting armature for detachably coupling the collar 212 to the mounting bracket 250. The optical mount 254 may be coupled to the body 252 opposite the longitudinal strap 270 in a position that places the prism 230 in front of the flashlight of the mobile phone 900.

The first lateral strap 260, the second lateral strap 264, and the longitudinal strap 270 may be linear bands of semi-rigid material. The distal end of the first lateral strap 260 may be coupled to a first clamp 262. The distal end of the second lateral strap 264 may be coupled to a second clamp 266. The distal end of the longitudinal strap 270 may be coupled to a third clamp 272. The proximal ends of the first lateral strap 260, the second lateral strap 264, and the longitudinal strap 270 may be slidably coupled to the body 252 such that the distal ends of the first lateral strap 260, the second lateral strap 264, and the longitudinal strap 270 are operable to be repositioned to match to the size of the mobile phone 900. An individual clamp selected from the first clamp 262, the second clamp 266, and the third clamp 272 may be a C-shaped armature such that the individual clamp may grasp a side of the mobile phone 900.

The locking knob 274 may lock the positions of the first lateral strap 260, the second lateral strap 264, and the longitudinal strap 270 such that the first lateral strap 260, the second lateral strap 264, and the longitudinal strap 270 may be positioned to match the size of the mobile phone 900 and then retained in position to hold the mounting bracket 250 onto the mobile phone 900. As a non-limiting example, tightening the locking knob 274 may press the first lateral strap 260, the second lateral strap 264, and the longitudinal strap 270 between the body 252 and the mechanism of the lock.

The invention 100 may further comprise a software application 290 that executes on a processor of the mobile phone 900. The software application 290 may comprise instructions for causing the processor to influence the on/off state and timing of the flashlight. As non-limiting examples, the software application 290 may provide a user interface that provides input to the software application 290 regarding the desired state and/or behavior of the flashlight. The software application 290 may illuminate the flashlight, may extinguish the flashlight, and may cause the flashlight to strobe.

In some embodiments, the prism 230 may be free to rotate relative to the top of the collar 212. Rotation of the prism 230 may change the appearance of the light 920 at the prism 230 by realigning the plurality of apertures 234 at the bottom of the prism 230 in comparison to the multiple color regions 218 of the lens 214. In some embodiments, the prism 230 may be manually rotated to change the appearance of the prism 230. In some embodiments, the prism 230 may rotate during normal usage of phone due to vibration and/or unequal weight distribution of the prism 230.

In use, the mounting bracket 250 may be coupled to the mobile phone 900 by repositioning the first lateral strap 260, the second lateral strap 264, and the longitudinal strap 270 to place the first clamp 262, the second clamp 266, and the third clamp 272 against sides of the mobile phone 900 and then tightening the locking knob 274. The collar 212 may be installed by pressing the collar 212 onto the optical mount 254 of the body 252. The prism 230 may be installed by pressing the prism 230 onto the collar 212.

Once the software application 290 is installed on the mobile phone 900, the software application 290 may be operable to turn the flashlight on or to strobe the flashlight to cause a visual display of the light 920 through the prism 230. The light 920 from the flashlight may pass through the lens 214 where the light 920 may be tinted and dispersed. The light 920 may additionally pass through the mask 232 at the bottom of the prism 230 which may permit the light 920 to pass through the plurality of apertures 234 and may block the light 920 elsewhere. The light 920 may further pass through the prism 230 where it may be further dispersed. The prism 230 may periodically be rotated to change the appearance of the light 920.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

As used in this disclosure, a "cavity" is an empty space or negative space that is formed within an object.

As used herein, "clip" may refer to a fastener that attaches to an object by gripping or clasping the object. A clip may be spring loaded.

As used herein, the words "couple", "couples", "coupled" or "coupling", may refer to connecting, either directly or indirectly, and does not necessarily imply a mechanical connection.

As used herein, the word "desired" refers to a specific value or action within a range of supported values or action. A "desired" value or action indicates that a range of values or actions is enabled by the invention and that a user of the invention may select a specific value or action within the supported range of values or action based upon their own personal preference. As a non-limiting example, for a fan that supports operational speed settings of low, medium, or high, a user may select a desired fan speed, meaning that the user may select low, medium, or high speed based upon their needs and preferences at the time of the selection.

As used in this disclosure, the terms "distal" and "proximal" may be used to describe relative positions. Distal refers to the object, or the end of an object, that is situated away from the point of origin, point of reference, or point of attachment. Proximal refers to the object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used in this disclosure, a "housing" is a rigid or semi-rigid casing that encloses and protects one or more devices.

As used herein, "irregular" may be descriptive of a physical property which cannot be described as linear, circular, planar, or conforming to the shape of a regular 2D or 3D polygon. As non-limiting examples, the physical property may be an outline shape, a placement pattern, spacings, heights, or combinations thereof. As a non-limiting example, irregular may be synonymous with random or pseudo-random.

As used in this disclosure, the word "lateral" refers to the sides of an object or movement towards a side. Lateral directions are generally perpendicular to longitudinal directions. "Laterally" refers to movement in a lateral direction.

As used in this disclosure, a "lens" is a transparent substance through which light can pass. A lens may or may not be formed with curved surfaces that are used to concentrate or disperse the light that travels through the lens.

As used herein, the word "longitudinal" or "longitudinally" refers to a lengthwise or longest direction.

As used herein, "novelty appearance" refers to an object having a shape and coloring that may be unusual, decorative, and non-functional.

As a non-limiting example, a coin purse shaped like a slice of watermelon may have a novelty appearance.

As used in this disclosure, "opaque" refers to an object or material that prevents the passage of light and/or other forms of radiations through the object or material.

As used herein, the terms "processor", "central processor", "central processing unit", "CPU", or "microprocessor" refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used herein, "resilient" or "semi-rigid" may refer to an object or material which will deform when a force is applied to it and which will return to its original shape when the deforming force is removed.

As used in this disclosure, a "ridge" is an elevated or raised portion of a structure.

As used herein, "rigid" refers to an object or material which is inflexible. If a force is applied to a rigid object the rigid object does not bend or deform unless the force applied reaches the breaking point of the rigid object.

As used herein, "strobe" may refer to the act of illuminating a light intermittently and repeatedly.

As used in this disclosure, "transparent" refers to a material that allows light to pass through the material without significant scattering such that an object can be clearly seen through the material.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A colored strobe for mobile phone comprising:
an optical instrument and a mounting bracket;

wherein the mounting bracket couples to a mobile phone such that the optical instrument is positioned in front of a flashlight of the mobile phone;

wherein the optical instrument alters optical properties of light emitted by the flashlight as the light passes through the optical instrument;

wherein the optical properties comprise a path of the light, color of the light, or both;

wherein operation of the flashlight while covered by the optical instrument provides a different appearance for the mobile phone;

wherein the optical instrument comprises a lens housing and a prism;

wherein the optical instrument detachably couples to the mounting bracket such that the optical instrument is positioned in front of the flashlight of the mobile phone;

wherein the lens housing comprises a collar and a lens;

wherein the lens housing detachably couples to an optical mount of the mounting bracket;

wherein the prism detachably couples to the lens housing;

wherein the collar is a mounting armature;

wherein the top of the collar couples to the lens;

wherein the bottom of the collar comprises a collar cavity which is an upward indentation of the bottom of the collar;

wherein a collar ridge surrounds the collar cavity on the inside wall of the collar cavity;

wherein the collar ridge interlocks with a mount lip of the optical mount when the collar is coupled to the optical mount;

wherein the collar is separated from the optical mount by applying upward force to the collar to overcome the interlocking of the collar ridge and the mount lip.

2. The colored strobe for mobile phone according to claim 1 wherein the lens disperses the light from the flashlight such that the light is redirected towards the entirety of the prism;

wherein the lens is transparent material that is shaped to alter the path of the light that passes through the lens.

3. The colored strobe for mobile phone according to claim 2 wherein the lens is a compound, diffractive lens such that the overall thickness of the lens is minimized.

4. The colored strobe for mobile phone according to claim 2 wherein the lens comprises a tint such that white light from the flashlight is tinted and emerges from the lens as a different color.

5. The colored strobe for mobile phone according to claim 4 wherein the lens comprises multiple color regions such that the light passing through the lens varies in color depending upon the specific path the light takes through the lens.

6. The colored strobe for mobile phone according to claim 4 wherein the prism disperses the light that enters the bottom of the prism;

wherein the top of the prism comprises transparent material;

wherein the bottom of the prism comprises a prism cavity which is an upward indentation of the bottom of the prism;

wherein a prism ridge surrounds the prism cavity on the inside wall of the prism cavity;

wherein the prism ridge interlocks with a collar lip of the collar when the prism is coupled to the collar;

wherein the prism is separated from the collar by applying upward force to the prism to overcome the interlocking of the prism ridge and the collar lip.

7. The colored strobe for mobile phone according to claim 6 wherein the prism is a conical shape.

8. The colored strobe for mobile phone according to claim 6 wherein the prism comprises a mask;

wherein the mask is a partially opaque surface that is located on the bottom of the prism;

wherein the mask limits the light passing through the prism such that a pattern of the light is created within the prism;

wherein the mask comprises a plurality of apertures such that the light passes through the mask at the plurality of apertures and the light is blocked by the mask elsewhere.

9. The colored strobe for mobile phone according to claim 8 wherein the plurality of apertures comprise an irregular spacing such that the pattern of the light dispersed by the prism is not symmetrical.

10. The colored strobe for mobile phone according to claim 8 wherein the mounting bracket comprises a body, a first lateral strap, a second lateral strap, a longitudinal strap, and a locking knob;

wherein the mounting bracket detachably couples to the mobile phone and retains the prism in a position that is in front of the flashlight.

11. The colored strobe for mobile phone according to claim 10 wherein the body is a rigid or semi-rigid armature that slidably couples to the first lateral strap, the second lateral strap, and the longitudinal strap;

wherein the body directs the first lateral strap and the second lateral strap laterally and directs the longitudinal strap longitudinally such that the first lateral strap and the second lateral strap are perpendicular to the longitudinal strap.

12. The colored strobe for mobile phone according to claim 11 wherein the body comprises the optical mount;

wherein the optical mount is a mounting armature for detachably coupling the collar to the mounting bracket;

wherein the optical mount is coupled to the body opposite the longitudinal strap in a position that places the prism in front of the flashlight of the mobile phone.

13. The colored strobe for mobile phone according to claim 12 wherein the first lateral strap, the second lateral strap, and the longitudinal strap are linear bands of semi-rigid material;

wherein the distal end of the first lateral strap is coupled to a first clamp;

wherein the distal end of the second lateral strap is coupled to a second clamp;

wherein the distal end of the longitudinal strap is coupled to a third clamp;

wherein the proximal ends of the first lateral strap, the second lateral strap, and the longitudinal strap are slidably coupled to the body such that the distal ends of the first lateral strap, the second lateral strap, and the longitudinal strap are operable to be repositioned to match to the size of the mobile phone;

wherein an individual clamp selected from the first clamp, the second clamp, and the third clamp is a C-shaped armature operable to grasp a side of the mobile phone.

14. The colored strobe for mobile phone according to claim 13
wherein the locking knob locks the positions of the first lateral strap, the second lateral strap, and the longitudinal strap such that the first lateral strap, the second lateral strap, and the longitudinal strap are positioned to match the size of the mobile phone and then retained in position to hold the mounting bracket onto the mobile phone.

15. The colored strobe for mobile phone according to claim 14
wherein the colored strobe for mobile phone further comprises a software application that executes on a processor of the mobile phone;
wherein the software application comprises instructions for causing the processor to influence the on/off state and timing of the flashlight;
wherein the software application illuminates the flashlight, extinguishes the flashlight, and causes the flashlight to strobe.

16. The colored strobe for mobile phone according to claim 15
wherein the prism is free to rotate relative to the top of the collar;
wherein rotation of the prism changes the appearance of the light at the prism by realigning the plurality of apertures at the bottom of the prism in comparison to the multiple color regions of the lens.

\* \* \* \* \*